United States Patent
Delogne

[15] 3,676,953
[45] July 18, 1972

[54] PLANT BOX

[72] Inventor: Jean Georges Delogne, 8, Place Julien Dillens, Saint Gilles, Belgium

[22] Filed: Aug. 31, 1970

[21] Appl. No.: 68,090

[30] Foreign Application Priority Data

Sept. 4, 1969 Belgium ................................. 78.718

[52] U.S. Cl. .............................................. 47/38.1, 47/39
[51] Int. Cl. ................................................... A01g 27/00
[58] Field of Search .............................. 47/38–39, 19

[56] References Cited

UNITED STATES PATENTS 1,977,827  10/1934  Kneller ........................ 47/38.1
1,820,843  8/1931   Spitz ............................ 47/39
2,081,337  5/1937   Lockyer ....................... 47/38.1
3,106,801  10/1963  Risacher ..................... 47/19 X

*Primary Examiner*—Robert E. Bagwill
*Attorney*—Sughrue, Rothwell, Mion, Zinn & Macpeak

[57] ABSTRACT

This invention concerns a plant box comprising a container having at a distance from its unperforated bottom a perforated element delimiting with said bottom a drainage chamber containing a quantity of water limited by at least one lateral overflow aperture. This container contains, upon to the perforated element, a mass of mineral substance regularly moistened by wicks conveying water to it by capillary action. The said container rests in a water-tight tray, mounted on rollers, which contains a further quantity of water serving to humidify the air surrounding the plants.

4 Claims, 3 Drawing Figures

PLANT BOX

The present invention relates to a plant box.

There exist plant boxes which have a container of terracotta or of compressed asbestos-cement, having a perforated bottom. The container contains a mass of suitable mineral substance, in which the roots of the plants grow. This mass of mineral substance is separated from the bottom of the container by a water-drainage layer, generally consisting of gravel or the remains of old containers. This container rests in a tray possibly mounted on rollers, which serves for the collection of the excess drainage-water.

These known plant boxes have the disadvantage that they ensure only an irregular moistening of the mass of mineral substance, producing a deterioration of the roots. In fact this moistening is often excessive and causes the roots to rot when the lower part of the mass of mineral substance is bathing in the drainage water contained in the tray in spite of the presence of the drainage layer placed on the perforated bottom of the container. Also, this moistening is frequently insufficient and causes the roots to wither when the drainage-water contained in the tray evaporates quickly in a particularly dry atmosphere. The life of plants in these known plant boxes is therefore uncertain, so that they are suitable only for robust specimens or in ideal climates, for example in green-houses, verandas or winter gardens.

There also exist round plant pots. Each of these terracotta pots can be provided with a circular perforated plate, generally of a synthetic material. The perforated plate applies directly against the wall of the pot. This perforated plate supports a mass of suitable mineral material containing the roots of the plants. Also the pot rests in a tray which is not provided with rolling means.

These known pots have the disadvantage of ensuring only an uncertain degree of moistening of the mass of mineral substance. In fact the drainage water is situated in the tray and in the lower chamber of the pot, which are linked between them by the hole at the bottom of the latter. This drainage water is exposed directly and continuously to the surrounding air and is therefore in danger of evaporating completely. Also, the perforated plate is often difficult to remove from a pot to be recovered because it is wedged into the latter under the weight of the mass of moistened mineral matter.

The invention relates to a new plant box which ensures simultaneously the continuous regular moistening of the mass of mineral material containing the roots of the plants, and that of the air surrounding them. This new plant pot enables, on a physiological level, the behavior of the plants to be definitely controlled in micro-climates, unsuitable up until now by reason of lack of light, lack of fresh air, insufficient degree of humidity of the surrounding air and lack of attention.

To this effect, the plant box in accordance with the invention has, in combination, a container of preferably relatively porous material, for example of compressed asbestos-cement, having at a distance from its unperforated bottom a perforated element of an identical or a similar material. The perforated element delimits at the bottom of the container a drainage chamber containing a quantity of water limited by at least one lateral overflow aperture provided in a lateral wall of this container, between the bottom and the perforated element. Upon the perforated element, the container contains a mass of suitable mineral substance in which the plant roots are placed and in which they grow. The mass of mineral substance is regularly moistened by wicks or similar members conveying water by capillary action from the drainage chamber through the holes of the perforated element to this mass of mineral substance. The container rests in a water-tight tray, preferably mounted on rollers, which can contain a further quantity of water serving to humidify the air surrounding the plant.

In accordance with a feature of the invention, the perforated element simply rests on flanges or shoulders inside or coming back within the lateral walls of the container.

In the case where the plants need warmth in order best to produce their physiological conditions for existence, the new plant box is provided with at least one electrical resistance placed near the above-mentioned perforated element and preferably above it. This resistance serves for the moderate heating of the mass of mineral substance containing the roots of the plants.

Further details and features of the invention will appear in the course of the description and on the drawings attached to the present specification, which represent diagrammatically and only by way of example one mode of embodiment of the invention.

In these different figures, identical elements are represented by the same reference numerals.

Figure 1:
FIG. 1 is a view in perspective of one mode of embodiment of the plant box in accordance with the invention, provided with a plant.
Figure 2:
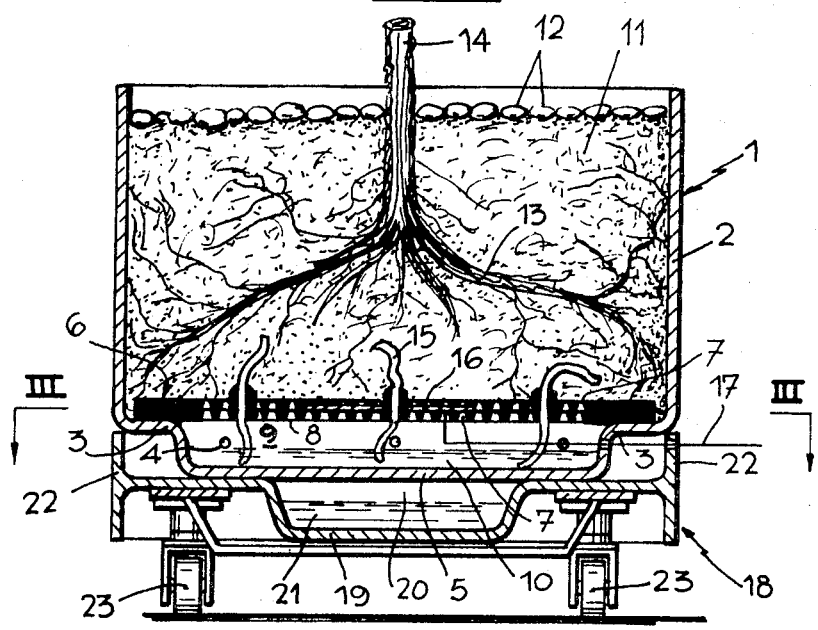
FIG. 2 is a vertical section of this plant box.
Figure 3:
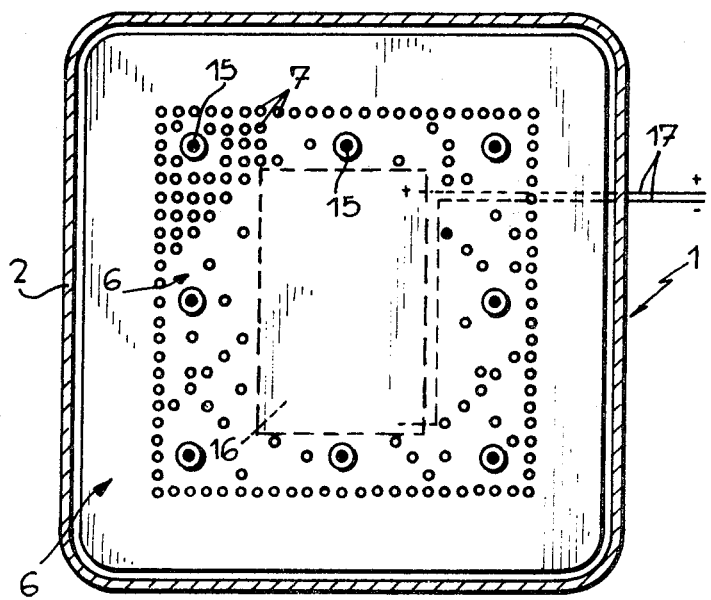
FIG. 3 is a horizontal section of the said plant box, along line III—III of the preceding Figure.

The plant box illustrated consists essentially of a container 1 of a porous material, for example of compressed asbestos-cement. The choice of such a material is determined by the fact that a liquid necessary to the plant can rise by capillary action in the walls of the container 1 from a supply, and regularly reach the roots of said plant. In the chosen, non-limitative case the container 1 has a square horizontal cross-section.

The lateral walls 2 of the container 1 have lower parts forming continuous flanges 3, which come back or inwardly project in relation to their remaining upper parts. These lateral walls 2 are unperforated but their lower parts have lateral apertures 4 regularly spaced and situated at the same level between the flanges 3 and their lower edges.

The bottom 5 of the container 1 is flat and unperforated. However, this bottom 5 is connected to the lateral walls 2 by an inwardly incurved fillet.

In this way, the lower part of the interior of the container 1 thus has a smaller horizontal section compared to the remaining part of it.

The container 1 has a perforated element in the form of a perforated double plate 6 which is for example flat and likewise of a porous material such as compressed asbestos-cement. A perforated plate 6 of this kind favors the development and growth of the young roots in the lower part of the mass of mould or compost. The unperforated edge part of the perforated plate 6 rests on the flanges 3 of the lateral walls 2. On the other hand, the remaining central part of this perforated plate 6 has corresponding holes 7 and 8 regularly spaced and essentially facing the whole surface of the bottom 5.

The perforated plate 6 thus delimits, together with the bottom 5 and the lower parts of the lateral walls 2, a drainage chamber 9 closed at the bottom and open at the sides by the apertures 4 and at the top by the holes 7 and 8. This drainage chamber 9 is intended to contain a quantity of water 10 which cannot pass the level of the lateral apertures 4. The overflow apertures 4 also permit the ventilation of this quantity of water 10, and yet they do not impede the ascent of this water into the upper parts os the lateral walls 2 of the container 1.

The container 1 contains a mass 11 of enriched mould or of similar mineral substance, arranged on the perforated plate 6. The mass of mould 11 is advantageously covered with gravel 12. The mass of mould 11 serves for the support and the development of the roots 13 of at least one plant 14.

This mass of mould 11 is regularly and continuously humidified with water by the wicks 15 or similar members. Each wick 15 extends from the mass of mould 11, through two corresponding holes 7 and 8 in the perforated plate 6 and the drainage chamber 9, to the quantity of water 10 in which it is partly immersed. In this way, this wick 15 conveys the water by capillary action from the drainage chamber 9 to the mass of mould 11, thus satisfying the roots 13 needs in liquid, possibly nutritive.

Advantageously, the mass of mould 11 can be heated if necessary by a flat electrical resistance 16 capable of moderately heating the bottom suitably for the development and growth of the young roots. In the case illustrated, the resistance 16 is arranged at the center of the perforated plate 6 and between the constituent parts thereof. In the case of a perforated plate consisting in a single layer, the resistance is preferably placed above this plate.

The resistance 16 is supplied with electric current by conductors 17. This resistance 16 and the conductors 17 are insulated in relation to the various constituent parts of the plant box.

The container 1 constituted and filled as above rests by its bottom 5 in a water-tight tray 18 consisting for example of compressed asbestos-cement.

In the mode of embodiment under consideration, the bottom 19 of the tray 18 has a central part which extends between two opposite edges thereof and which is low in relation to the remaining edge parts, on which the container 1 effectively rests. In this way, the bottom 19 of the tray 18 and that 5 of the container 1 delimit between them a lower chamber 20 which is upwardly open at its two ends. The lower chamber 20 is intended to contain a quantity of water 21 which can originate from the overflow of the drainage chamber 9. Since evaporation can be accelerated by heating the resistance 16, the quantity of water 21 freshens up the leaves of the plant 14 which are directly above this source of humid air which, moreover, is absorbed by the pores on the lower surface of these leaves.

On the other hand, the lateral walls 22 of the tray 18 extend on either side of its bottom 19 and practically hide the lower part of the plant box.

The tray 18 is mounted on a metal support 23 and rests thereon by the edge parts of its bottom 19. The support 23 is provided with rollers 24 by means of which it can roll over the surface on which it stands. In this way, the whole plant box is easily and wholly displaceable on this surface. It is to be noted that the support 23 and the rollers 24 keep the tray 18 at a distance from the ground. In this way, an air current is able to circulate between the tray 18 and the ground and to prevent any condensation of liquid on the lower surface of the bottom 19 of this tray 18. Thus any dirtying or wetting of the ground beneath or near the plant box is avoided.

Obviously the invention is not limited exclusively to the mode of embodiment illustrated, and modifications can be made to the form, the arrangement and the construction of certain of the elements involved in its production, so long as these modifications are not at variance with the subject-matter of each of the following claims.

What I claim is:

1. Plant box comprising in combination: a container of preferably relatively porous material, such as compresses asbestos-cement, said container having an unperforated bottom and lateral side walls with continuous inner flanges along their lower edges, said inner flanges having a generally horizontal portion extending inwardly around the entire perimeter of the container and a downwardly extending portion connecting with said bottom, said lateral walls having at least one overflow aperture through the inner flanges, a perforated plate supported on said inner flanges of the lateral walls at a distance from the unperforated bottom of the container, said perforated plate delimiting with said bottom a drainage chamber containing a quantity of water, limited by the overflow aperture, a mass of suitable mineral substance container within said container upon the perforated plate and in which the plant roots grow, wick means extending through perforations in the perforated plate, said wick means adapted for conveying water by capillary action from the drainage chamber to the mass of mineral substance to regularly moisten said mineral substance, a water-tight tray for supporting said container, said water-tight tray having a horizontal bottom surrounded by a continuous lateral wall, said bottom including a longitudinal central recess formed therein and extending between opposite walls, the remaining portions of said bottom on the sides of said central recess adapted for supporting said container, the unperforated bottom of said container and said central recess forming a lower chamber open upwards at its ends and containing water to be evaporated through the open sapce between the walls of the tray and the lateral walls of the container to humidify the air surrounding the plant, a support for the tray positioned under the bottom thereof and between the lateral walls of said tray, said support being mounted on rollers, at least one electrical resistance heating means placed adjacent the perforated plate, said resistance heating means serving for moderately heating the mass of mineral substance containing the roots of the plant.

2. A plant box as recited in claim 1, wherein said perforated plate is formed of relatively porous material.

3. A plant box as claimed in claim 1, wherein said electrical resistance heating means is positioned above said perforated plate.

4. A plant box as claimed in claim 1, wherein said lateral walls of said tray are aligned with the lateral walls of said container to give an appearance of a generally continuous lateral side wall.

* * * * *